US012228956B2

(12) United States Patent
Weil

(10) Patent No.: US 12,228,956 B2
(45) Date of Patent: Feb. 18, 2025

(54) LOW HEADROOM CASCODE BIAS CIRCUIT FOR CASCODE CURRENT MIRRORS

(71) Applicant: QUALCOMM Incorporated, San Diego, CA (US)

(72) Inventor: Andrew Weil, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 234 days.

(21) Appl. No.: 17/982,420

(22) Filed: Nov. 7, 2022

(65) Prior Publication Data

US 2024/0152170 A1 May 9, 2024

(51) Int. Cl.
*G05F 3/26* (2006.01)

(52) U.S. Cl.
CPC .................................... *G05F 3/262* (2013.01)

(58) Field of Classification Search
CPC ....................................................... G05F 3/262
See application file for complete search history.

(56) References Cited

U.S. PATENT DOCUMENTS 6,617,915 B2 * 9/2003 Rajan ...................... G05F 3/262 330/288
9,310,825 B2 * 4/2016 Bohannon ................. G05F 3/30
2006/0091940 A1 5/2006 Kimura
2006/0226893 A1 * 10/2006 Abel ....................... G05F 3/262 327/543
2008/0186101 A1 8/2008 Arakali et al.
2009/0160557 A1 * 6/2009 Luzzi ...................... G05F 3/262 330/288
2010/0127776 A1 * 5/2010 Chow ..................... H03F 1/226 330/288
2016/0349785 A1 12/2016 Ciubotaru
2024/0134401 A1 * 4/2024 Abesingha ............. G05F 3/262

OTHER PUBLICATIONS

Razavi B., "Design of Analog CMOS Integrated Circuits", 1st Edition, 1999, pp. 1-7.
International Search Report and Written Opinion—PCT/US2023/035926—ISA/EPO—Feb. 16, 2024.

* cited by examiner

*Primary Examiner* — Sisay G Tiku
(74) *Attorney, Agent, or Firm* — Haynes and Boone, LLP

(57) ABSTRACT

A cascode bias circuit biases a gate of a cascode transistor in a cascode current mirror. The cascode bias circuit includes a first transistor configured to conduct a first current and includes a second transistor configured to conduct a second current. The first and second transistors couple to a third transistor configured to conduct a sum of the first current and the second current. A gate of the first transistor couples to a gate of the cascode transistor to bias the cascode transistor.

14 Claims, 9 Drawing Sheets

-- Prior Art --

LOW HEADROOM CASCODE BIAS CIRCUIT FOR CASCODE CURRENT MIRRORS

TECHNICAL FIELD

This application relates to bias circuits for current mirrors, and more particularly, to a low headroom cascode bias circuit for cascode current mirrors.

BACKGROUND

As shown in FIG. 1, a current mirror 100 may be constructed using a diode-connected transistor M1 having a gate connected to a matched current source transistor M2. A current source 105 drives a reference current I through the channel of the diode-connected transistor M1. Assuming that the reference current produces a sufficient (greater than subthreshold) current density in the diode-connected transistor M1, diode-connected transistor M1 conducts the reference current in saturation. A gate-to-source voltage of diode-connected transistor M1 will thus be a function of the reference current. Since the current source transistor M2 has the same gate-to-source voltage, current source transistor M2 will ideally operate in saturation to conduct a copy of the reference current.

An issue with this ideal behavior is that the drain-to-source voltage across diode-connected transistor M1 is its gate-to-source voltage whereas the drain-to-source voltage across current source transistor M2 will depend upon the voltage characteristics of output voltage circuit 110. The drain-to-source voltages of transistors M1 and M2 may thus be non-equal. Non-equal drain-to-source voltages for transistors M1 and M2 cause transistors M1 and M2 to have non-equal effective channel lengths. The resulting channel-length modulation lowers the accuracy of the current mirroring.

SUMMARY

In accordance with an aspect of the disclosure, a cascode bias circuit is provided that includes: a first current source configured to source a first current; a second current source configured to source a second current; a first transistor having a drain coupled to the first current source; a second transistor having a source coupled to a source of the first transistor and having a drain coupled to the second current source; and a third transistor having a drain coupled to a source of the first transistor and coupled to a source of the second transistor In accordance with another aspect of the disclosure, a method of biasing a cascode current mirror is provided that includes: driving a first current into a first transistor to develop a gate-to-source voltage across the first transistor; driving a second current into a second transistor to develop a threshold voltage difference between a gate and a drain of the second transistor; combining the first current and the second current at a drain of the second transistor and at a drain of the first transistor to form a combined current; driving the combined current into a third transistor to cause a gate voltage of the first transistor to equal a sum of the gate-to-source voltage of the first transistor and a drain-to-source voltage of the third transistor; and biasing a gate of a first cascode transistor in the cascode current mirror with the gate voltage of the first transistor.

In accordance with another aspect of the disclosure, a cascode current mirror is provided that includes: a first cascode transistor; a current source transistor in series with the first cascode transistor; and a cascode bias circuit including: a first transistor configured to conduct a first current to generate a first gate-to-source voltage, the first transistor having a gate coupled to a gate of the first cascode transistor; a second transistor configured to conduct a second current to generate a second gate-to-source voltage substantially equal to a transistor threshold voltage; and a third transistor coupled to a drain of the first transistor and to drain of the second transistor, the third transistor having a gate coupled to a gate of the second transistor.

In accordance with yet another aspect of the disclosure, a cascode current mirror is provided that includes: a first current source configured to source a first current; a first cascode transistor configured to conduct the first current; a cascode bias circuit including: a second current source configured to source a second current; a first transistor configured to conduct the second current and having a gate coupled to a gate of the first cascode transistor; a second current source configured to source a third current; a second transistor configured to conduct the second current; and a third transistor coupled to a drain of the first transistor and to drain of the second transistor, the third transistor having a gate coupled to a gate of the second transistor, wherein both the second current and the third current are less than the first current.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figure.

DETAILED DESCRIPTION

Figure 1:
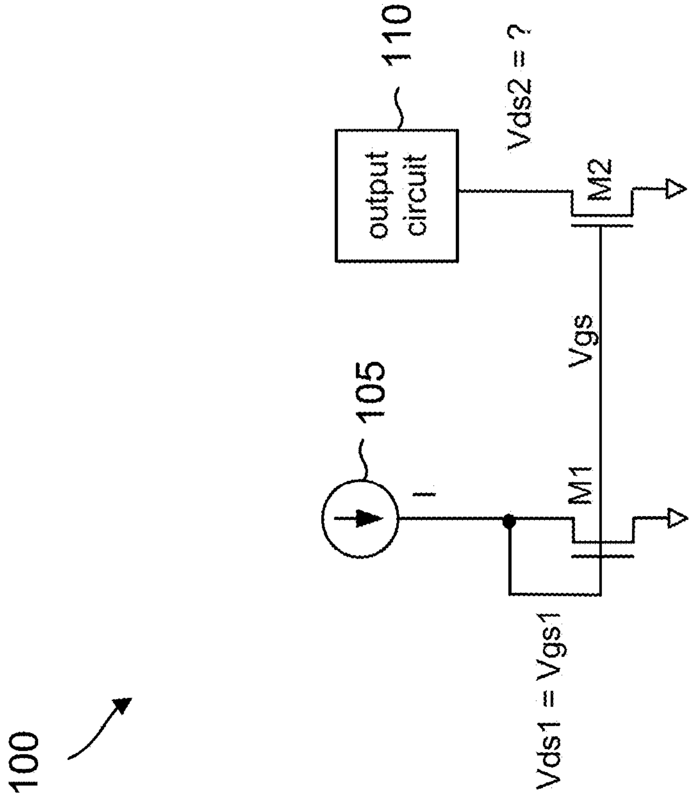
FIG. 1 is a circuit diagram of a current mirror.
Figure 2:
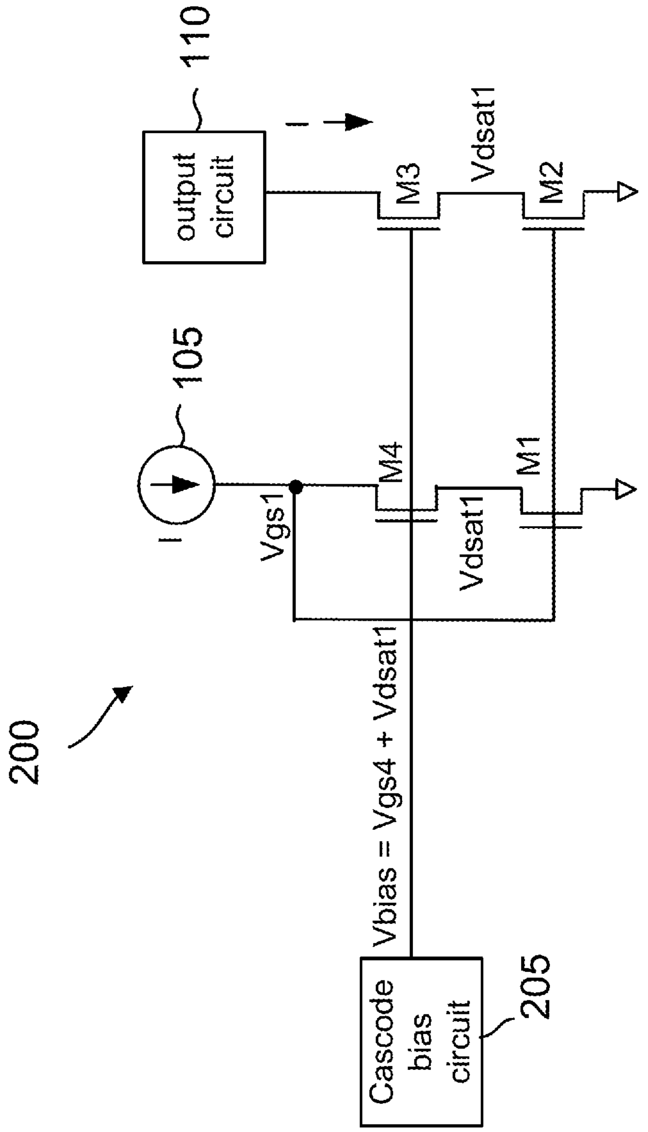
FIG. 2 is a circuit diagram of an NMOS cascode current mirror including a cascode bias circuit in which the cascode bias circuit biases only the gates of a pair of cascode transistors in accordance with an aspect of the disclosure.

As discussed with regard to current mirror 100, should diode-connected transistor M1 and current source transistor M2 have non-equal drain-to-source voltages, the resulting channel-length modulation adversely affects the current mirroring accuracy. It is thus advantageous to have equal drain-to-source voltages for diode-connected transistor M1 and current source transistor M2. To provide these equal drain-to-source voltages, current mirror 100 is modified herein as shown for a cascode current mirror 200 of FIG. 2. A cascode transistor M3 at the drain of the current source transistor M2 effectively insulates the current source transistor M2 from any varying voltage from output circuit 110. To allow the current source transistor M2 to operate at the edge of the saturation region, the diode connection of the diode-connected transistor M1 is modified such that a cascode transistor M4 couples between the gate and drain of the diode-connected transistor M1. Despite the presence of the cascode transistor M4 between the gate and drain of the diode-connected transistor M1, it can be shown that diode-connected transistor M1 is indeed effectively diode-connected. The cascode transistor M4 introduces a voltage drop between the gate and drain voltages of the diode-connected transistor M1. Both cascode transistors M3 and M4 are matched. As defined herein, one transistor is deemed to be matched to another transistor when their relative sizes and biases are such that both transistors have the same current density while operating in saturation. The current mirror transistor M2 will then conduct a copy of the reference current as explained further herein without any inaccuracies caused by channel-length modulation effects. Although the issues of channel-length modulation are thus effectively solved, a suitable cascode bias circuit needs to be provided for the biasing of the cascode transistors. However, designing a cascode bias circuit to have a low voltage headroom and without body effect or other issues has been problematic. These design issues are solved such that the cascode bias circuit introduced herein has an advantageously low headroom (the maximum voltage in the cascode bias circuit) and is substantially free of any body effects.

The disclosed cascode bias circuit may be constructed using either n-type metal-oxide semiconductor (NMOS) transistors or p-type metal-oxide semiconductor (PMOS) transistors. Current mirror 200 is a NMOS current mirror and thus includes an NMOS cascode bias circuit 205. Similarly, a PMOS cascode bias circuit is used to bias a PMOS cascode current mirror. NMOS cascode bias circuit 205 will be discussed first, followed by a discussion of a PMOS implementation. Before analyzing the NMOS cascode bias circuit 205 in detail, cascode current mirror 200 will be discussed in more detail as follows. The gate of the diode-connected transistor M1 and the drain of the cascode transistor M4 both couple to the current source 105 providing the reference current (I). Cascode transistor M4 is also denoted herein as a first cascode transistor. The cascode transistor M3 couples between the drain of the current source transistor M2 and the output circuit 110. Cascode transistor M3 is also denoted herein as a second cascode transistor. The sources of the diode-connected transistor M1 and the current source transistor M2 both couple to ground.

The gate of the diode-connected transistor M1 couples to the gate of the current-source transistor M2. A gate-to-source voltage Vgs1 of the diode-connected transistor M1 is thus also the gate-to-source voltage of the current source transistor M2. Cascode bias circuit 205 biases the gates of cascode transistors M3 and M4 with the cascode bias voltage Vbias. Since matched cascode transistors M3 and M4 have the same gate voltage Vbias and are conducting the same reference current, the gate-to-source voltage Vgs4 of cascode transistor M4 equals the gate-to-source voltage Vgs3 of cascode transistor M3. The drain-to-source voltage Vds1 of the diode-connected transistor M1 and a drain-to-source voltage of the current source transistor M2 are thus equal. Since both transistors M1 and M2 are in saturation if the gate voltage Vbias is greater than a sum of Vgs4 and Vds1, the following discussion will refer to the drain-to-source voltage Vds1 of the diode-connected transistor M1 as Vdsat1. It may thus be appreciated that the gate-to-source voltage Vgs1 of the diode-connected transistor M1 equals the gate-to-source voltage of the current source transistor M2 while both transistors have the same drain-to-source voltage. In this fashion, current source transistor M2 accurately mirrors the reference current, which is then conducted by the output circuit 110 as was desired.

To provide a lowest possible drain voltage of cascode transistor M3 while still keeping cascode transistor M3 in saturation, the diode-connected transistor M1 should be at the edge of saturation, i.e., its drain-to-source voltage Vdsat1 should be substantially equal to Vgs1−Vth1, where Vth1 is the threshold voltage of the diode-connected transistor M1. Suppose that the cascode transistors M3 and M4 are sized such that their overdrive voltage (the difference between their gate-to-source voltage and their threshold voltage) is well below their threshold voltage. The drain voltage of the cascode transistor M4 is Vgs1 due to the diode connection of the diode-connected transistor M1. The minimum drain-to-source voltage Vds4 of the cascode transistor M4 in which the cascode transistor M4 is still in saturation is the difference between its gate-to-source voltage Vgs4 and its threshold voltage Vth4. Since the source voltage of the cascode transistor M4 is Vdsat1, the gate voltage of Vgs4 equals the sum of its gate-to-source voltage Vgs4 and Vdsat1. The cascode bias voltage Vbias thus equals the sum of Vgs4 and Vdsat1.

Figure 3:
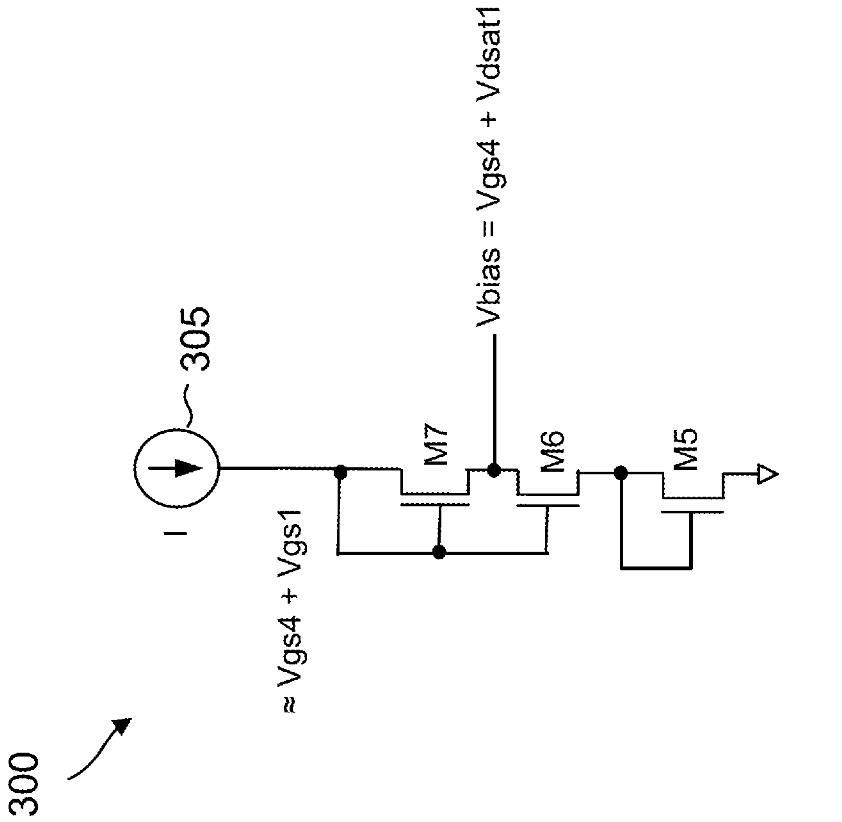
FIG. 3 is a circuit diagram of a cascode bias circuit.

Although it thus desirable to for a cascode bias circuit to generate a cascode bias voltage that equals the sum of Vgs4 and Vdsat1, this cascode bias voltage generation has been problematic. For example, consider the cascode bias circuit 300 of FIG. 3. An NMOS transistor M5 is diode-connected and has a source coupled to ground. A drain of transistor M5 couples to a source of a transistor M6. A drain of transistor M6 couples to a source of a diode connected NMOS transistor M7. The gate of transistor M7 couples to the gate of transistor M6 and to the drain of transistor M7. A current source 305 drives the reference current I through the channels of transistors M5, M6, and M7. Transistor M5 is matched to the cascode transistor M4 of cascode current mirror 200. A gate-to-source voltage of transistor M5 thus equals Vgs4. Transistor M6 is matched to the diode-connected transistor M1 of cascode current mirror 200. A drain-to-source voltage of transistor M6 thus equals Vdsat1. The cascode bias voltage Vbias is developed at the drain of transistor M6. The cascode bias voltage Vbias thus ideally equals Vgs4+Vdsat1. With respect to this cascode bias voltage generation, transistor M7 is sized so that it operates at the edge of the subthreshold region. A gate-to-source voltage of transistor M7 thus equals its threshold voltage. The gate voltage of transistor M7 is the sum of Vgs4 and Vgs1 (again assuming that transistor M5 matches cascode transistor M4 of the cascode current mirror 200 and that transistor M6 matches the diode-connected transistor M1 of the cascode current mirror). Assuming that the threshold voltage of transistor M7 matches the threshold voltage Vth1 of the diode-connected transistor M1 of the cascode current mirror 200, the threshold voltage drop of Vth1 from the gate voltage of transistor M7 indeed provides the desired value Vgs4+Vdsat1 of the cascode bias voltage.

Although cascode bias circuit 300 ideally generates the desired value for the cascode bias voltage Vbias, there are several issues that affect the accuracy of this bias voltage generation. For example, the source voltage of transistor M7 is substantially equal to a sum of Vgs4+Vdsat1. In contrast, the source voltage of the diode-connected transistor M1 is ground. Thus, there is a substantial body effect difference between the threshold voltages of transistors M1 and M7, which is detrimental to the desired matching of threshold voltages. In addition, if the threshold voltage of transistor M7 is too large, transistor M6 is forced into the triode region instead of operating in saturation. Moreover, the source voltage of transistor M5 is ground whereas the source voltage of the cascode transistor M4 is Vdsat1 such that there are body effect differences between these two transistors, which leads to threshold voltage differences. Similarly, the threshold voltages of diode-connected transistor M1 and transistor M6 will be different due to the body effect differences. In addition, the headroom of cascode bias circuit 300 is limited since the drain voltage of transistor M7 substantially equals the sum of Vgs4 and Vgs1. Given this limited headroom, if a power supply voltage for current source 305 is relatively low, there may not be enough voltage margin for the current source 305 to operate properly or as designed.

Figure 4:
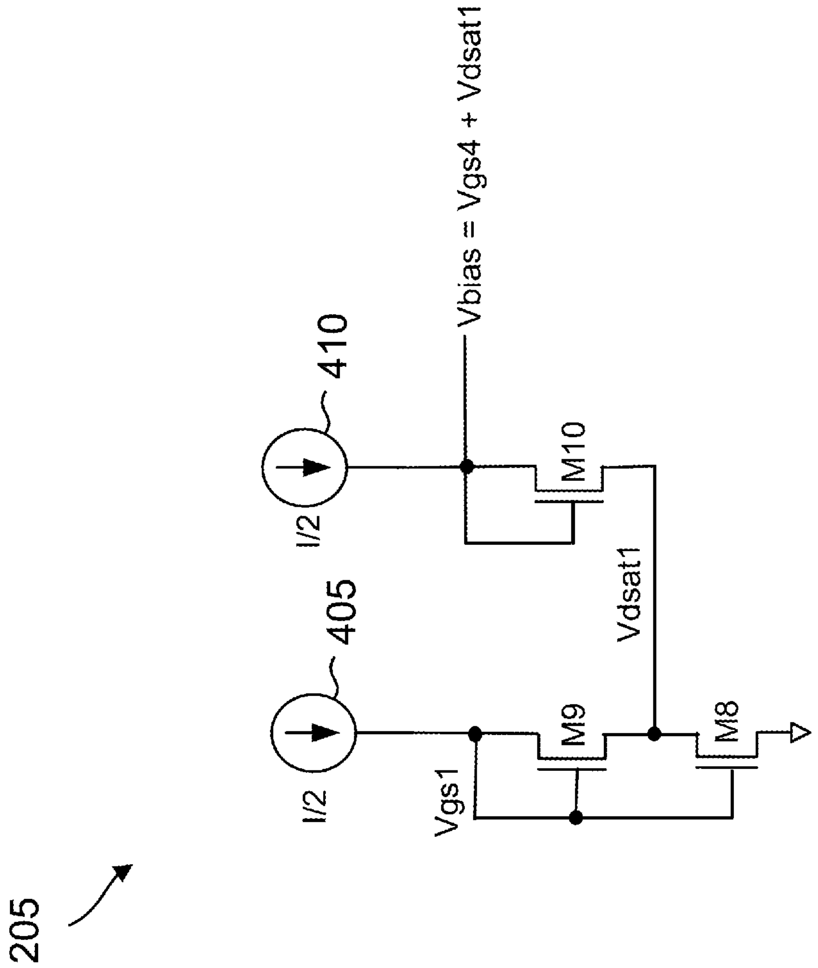
FIG. 4 is a circuit diagram of the cascode bias circuit in the cascode current mirror of FIG. 2 in accordance with an aspect of the disclosure.

The cascode bias circuit 205 of current mirror 200 advantageously avoids these issues. Cascode bias circuit 205 is shown in more detail in FIG. 4. An NMOS transistor M8 has its source coupled to ground and a drain coupled to an NMOS transistor M9. The gate of transistor M8 couples to the gate of transistor M9. The drain of transistor M9 couples to its gate and also to the output terminal of a current source 405 that outputs one-half (I/2) of the reference current. An NMOS diode-connected transistor M10 has its source coupled to the drain of transistor M8. A current source 410 drives one-half of the reference current (I/2) into the gate and drain of transistor M10. Transistor M10 may also be denoted herein as a first transistor. Similarly, transistor M9 may be denoted as a second transistor whereas transistor M8 may be denoted as a third transistor.

Transistor M8 conducts the reference current I since it must conduct a combined current formed by the combination of I/2 from current source 405 and I/2 from current source 410. Transistor M8 matches the diode-connected transistor M1 in cascode current mirror 200. A gate-to-source voltage of transistor M8 will thus substantially equal Vgs1. Transistor M9 is sized so as to be at the edge of the subthreshold region while it conducts I/2. A gate-to-source voltage of transistor M9 is thus equal to the threshold voltage of transistor M9. Assuming that this threshold voltage is substantially equal to the threshold voltage Vth1 of the diode-connected transistor M1, the source voltage of transistor M9 is thus substantially equal to Vgs1−Vth1, which equals Vdsat1. Transistor M10 may be one-half the size of cascode transistor M4. Since this one-half size transistor is conducting one-half the reference current, the current density in transistor M10 matches the current density in the cascode transistor M4. It follows that a gate-to-source voltage of transistor M10 equals Vgs4. The cascode bias voltage Vbias is produced at the drain of transistor M10 and will thus equal the desired value of Vgs4+Vdsat1.

Cascode bias circuit 205 has a number of advantages as compared to cascode bias circuit 300. For example, the source voltage of transistor M8 matches the source voltage of the diode-connected transistor M1 in cascode current mirror 200. There are thus no body effect issues that would affect the matching of transistor M8 to diode-connected transistor M1. In contrast, the source voltages of transistors M6 in cascode bias circuit 300 and diode-connected transistor M1 are different. Similarly, the source voltage of transistor M10 in cascode bias circuit 205 is the same as the source voltage of cascode transistor M4 in cascode current mirror 200. In contrast, the source voltage of transistor M5 in cascode bias circuit 300 is not equal to the source voltage of cascode transistor M4. Although the source voltage of transistor M9 in cascode bias circuit 205 is not equal to the source voltage of diode-connected transistor M1, these two source voltages are relatively similar compared to the larger source voltage differences between transistor M7 of cascode bias circuit 300 and the diode-connected transistor M1. Transistor M9 in cascode bias circuit 205 thus better matches the threshold voltage of the diode-connected transistor M1. Finally, the highest voltage in cascode bias circuit 300 is Vgs4+Vgs1 whereas it is just Vgs1+Vdsat1 in cascode bias circuit 205. Cascode bias circuit 205 thus advantageously is substantially free from body effect errors and has improved headroom and lowered process, voltage, and temperature variations.

It will be appreciated that cascode bias circuit 205 may be modified so long as the desired matching current densities in saturation are achieved between transistors. For example, suppose that the current sources 405 and 410 each sourced the reference current I instead of I/2. In that case, transistor M8 would be sized to be twice as large as the diode-connected transistor M1 so that both transistors have the same current density while operating in saturation. Similarly, transistor M10 would then have the same size as the cascode transistor M4. The size of transistor M9 would also have to be adjusted so that it is at the edge of the threshold region while conducting the reference current I. More generally, the sizes of transistors M8, M9, and M10 as well as the currents from current sources 405 and 410 may be varied so long as the desired current densities are achieved.

Figure 5:
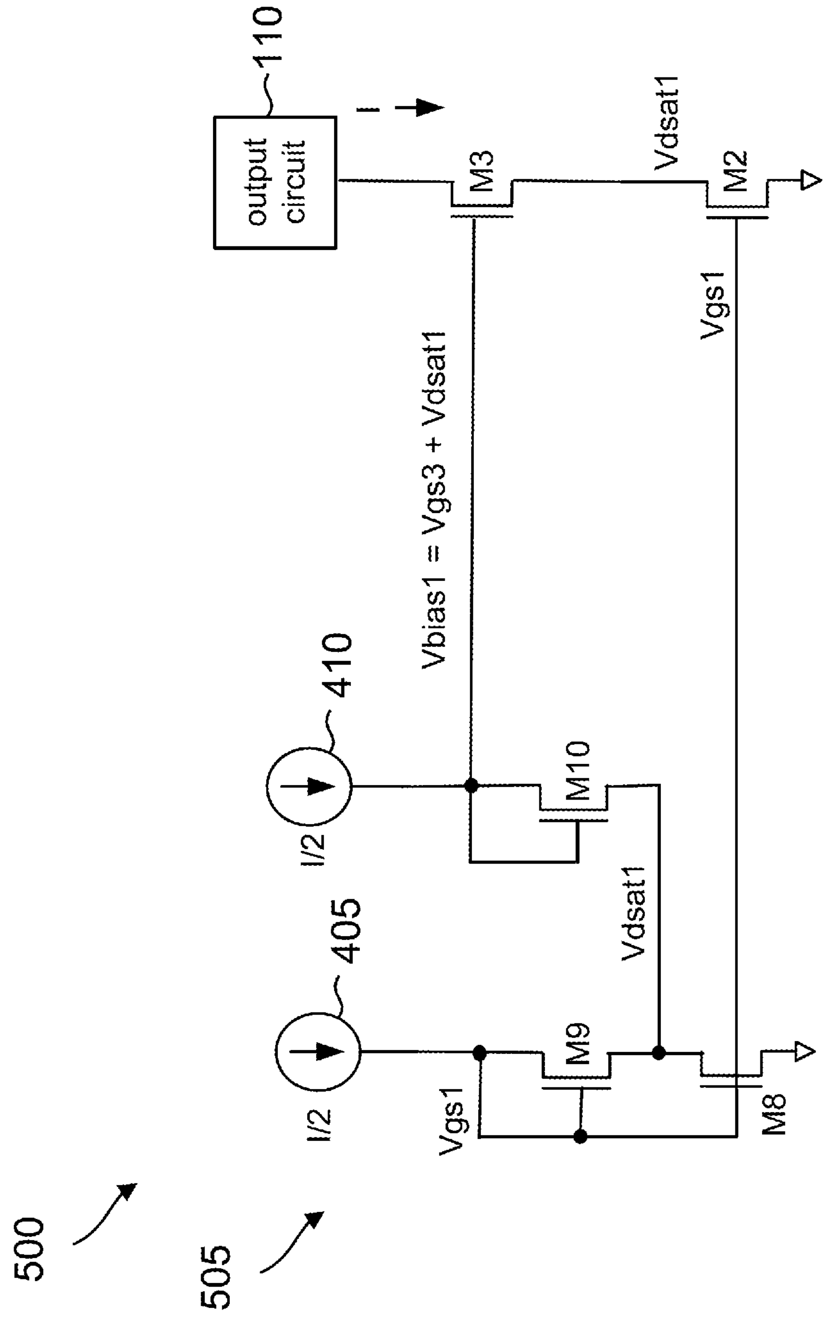
FIG. 5 is a circuit diagram of an NMOS cascode current mirror including a cascode bias circuit in which the cascode bias circuit biases only the gates of a cascode transistor and of a current source transistor in accordance with an aspect of the disclosure.

Note that transistor M8 is effectively diode connected and may thus function as an analog of the diode-connected transistor M1. Diode-connected transistor M1 and cascode transistor M4 are thus not included in a resulting cascode current mirror 500 as shown in FIG. 5. Current source transistor M2, cascode transistor M3, and output circuit 110 are arranged as discussed for cascode current mirror 200. A cascode bias circuit 505 has the current sources 405 and 410 coupled to transistors M8, M9, and M10 as discussed for cascode bias circuit 205. However, the gate of transistor M8 in cascode bias circuit 505 couples to a gate of the current source transistor M2. In addition, the drain of transistor M10 in cascode bias circuit 505 couples only to the gate of transistor M3 as the cascode transistor M4 is eliminated. Since cascode transistor M3 was matched to cascode transistor M4 in cascode current mirror 200, the current density in transistor M10 in cascode current mirror 500 matches the current density in cascode transistor M3 assuming that the same transistor sizes are used as discussed for cascode current mirror 200. Transistor M8 and M2 are sized so that they have matching current densities. Since their gates are coupled, a gate-to-source voltage Vgs1 of the current source transistor M2 is also the gate-to-source voltage of the transistor M8. Both transistors M8 and M2 have the same gate-to-source voltage of Vdsat1 so that the current source transistor M2 accurately mirrors the reference current I. A PMOS implementation for a cascode bias circuit will now be discussed.

Just the NMOS implementation, a PMOS implementation may include in the PMOS cascode current mirror the PMOS equivalents of diode-connected transistor M1 and cascode transistor M4. In such an implementation, the PMOS cascode bias circuit would just bias the cascode transistors. But as analogously noted with regard to cascode current mirror 500, the PMOS cascode bias circuit itself include an analog of the diode-connected transistor in the cascode current mirror. In such an implementation, the PMOS cascode bias circuit biases not only the cascode transistor but also the current source transistor. A PMOS cascode bias circuit for biasing only the cascode transistors in a PMOS cascode current mirror will be discussed first, followed by a discussion of a PMOS cascode bias circuit that biases a cascode transistor and a current source transistor in a PMOS cascode current mirror.

Figure 6A:
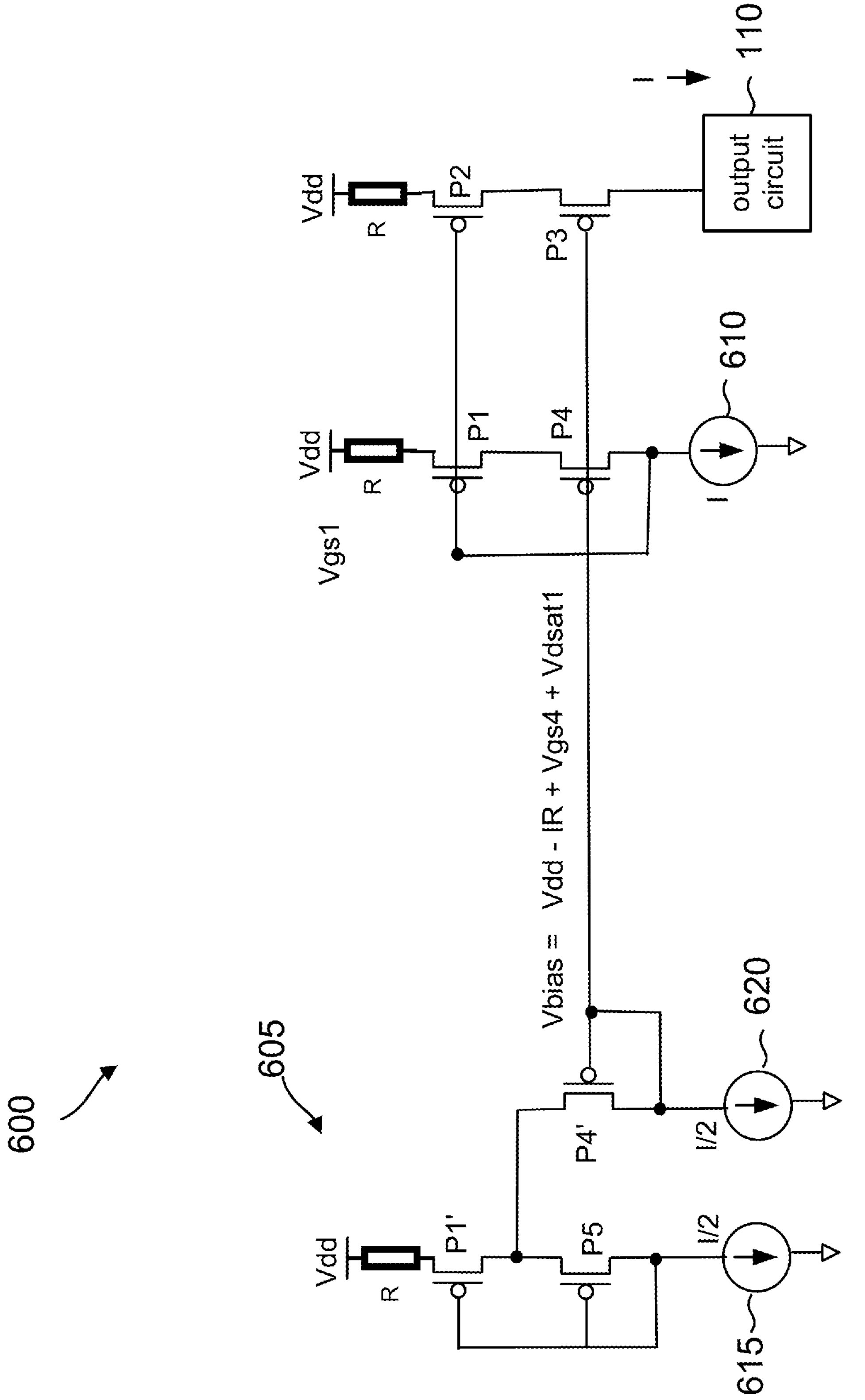
FIG. 6A is a circuit diagram of a PMOS cascode current mirror including a cascode bias circuit in which the cascode bias circuit biases only the gates of a pair of cascode transistors in accordance with an aspect of the disclosure.

An example PMOS cascode bias circuit 605 is shown in FIG. 6A that biases only a pair of cascode transistors P4 and P3 in a PMOS cascode current mirror 600. A diode-connected PMOS transistor P1 is the PMOS analog to diode-connected transistor M1 of the NMOS cascode current mirror 200. The gate of diode-connected transistor P1 couples to a gate of a PMOS current mirror transistor P2 that is the analog of the NMOS current mirror transistor M2. The sources of transistors P1 and P2 couple to a power supply node for a power supply voltage Vdd through respective degeneration resistors each have a resistance of R. Note that analogous degeneration resistors may be used at the sources of transistors M1 and M2 in NMOS cascode bias circuit implementations. A PMOS cascode transistor P3 couples between a drain of the current mirror transistor P2 and an output circuit 315 that will receive the mirrored version of the reference current I. Similarly, a PMOS cascode transistor P4 couples between a drain of the diode-connected transistor P1 and a current source 610 that sources the reference current. The gate of the (effectively) diode-connected transistor P1 couples to the drain of the cascode transistor P4. Cascode transistor P4 is an example of a first cascode transistor whereas cascode transistor P3 is an example of a second cascode transistor.

A cascode bias circuit 605 functions as a PMOS analog of the NMOS cascode bias circuit 205. A PMOS transistor P1' matches the diode-connected transistor P1. A source of transistor P1' couples through a degeneration resistor of resistance R to the power supply node for the power supply voltage Vdd. It will be appreciated that an analogous degeneration resistor may be inserted at the source of transistor M8 in the NMOS cascode bias circuit 205. Transistor P1' conducts a combined current equaling the reference current I as generated by a current source 615 that sources I/2 and as generated by a current source 620 that sources I/2. The resistor R at the source of transistor P1' introduces an Ohmic voltage loss equaling a product of I and its resistance R such that a source voltage of transistor P4' equals Vdd−IR. A drain of transistor P1' couples to a source of a PMOS transistor P5. A drain of transistor P5 couples to current source 615. The gate of transistor P1' couples to the drain of transistor P5 so that transistor P1' is effectively diode connected. A gate of transistor P1' also couples to the gate of transistor P5. The drain of transistor P1' also couples to a source of a PMOS diode-connected transistor P4'. The drain of transistor P4' couples to the current source 620. Since transistors P5 and P4' both conduct I/2, it may be readily seen that transistor P1' conducts a combined current equaling the reference current I. Transistor P5 is sized analogously as discussed for transistor M9 so that a gate-to-source voltage of transistor P5 equals its threshold voltage. Assuming that this threshold voltage equals the threshold voltage Vth1 of transistor P1, the drain voltage of transistor P5 equals Vdd−IR+Vgs1−Vth1, which equals the desired value of Vdd−IR+Vdsat1.

A gate of transistor P4' couples to the gates of the cascode transistors P3 and P4 to bias the gates of the cascode transistors P3 and P4 with a cascode bias voltage Vbias. As discussed for transistor M10, transistor P4' may be one-half the size of transistor P4 so that it has the same current density of transistor P4. More generally, the sizes and currents of transistors P4 and P4' may be varied from these values so long as they operate in saturation and have the same current density. A gate-to-source voltage of the transistor P4' will thus match a gate-to-source voltage Vgs4 of the cascode transistor P4. In this fashion, a gate-to-source voltage of transistor P4' will replicate Vgs4. An analogous matching of current densities is established for transistors P1 and P1'. A drain-to-source voltage Vdsat1 of transistor P1 thus matches a drain-to-source voltage of transistor P1'. Since the degeneration resistors each introduce a voltage drop of the product IR, the source voltages of transistors P1 and P1' both equal Vdd−IR. The gate voltage of transistor P1' equals Vdd−IR+Vgs1 (note that Vgs1 is negative for a PMOS implementation). The drain of transistor P1' equals Vdd−IR+Vgs1+Vdsat1 (note that the drain-to-source voltage Vdsat1 of transistor P1 is negative). Since transistor P4' matches the current density of transistor P4 in saturation, the gate-to-source voltage Vgs4 of transistor P4 is also the gate-to-source voltage of transistor P4'. The gate voltage of transistor P4' thus equals Vdd−IR+Vgs4+Vdsat1, which functions as the cascode bias voltage Vbias generated by cascode bias circuit 605.

With the cascode bias voltage Vbias at the gate of cascode transistor P4, its source voltage will equal Vdd−IR+Vdsat1. Similarly, the source voltage of the cascode transistor P3 will equal Vdd−IR+Vdsat1. The drain-to-source voltage of the diode-connected transistor P1 and the current source transistor P2 will thus both equal Vdsat1 so that the current source transistor P2 mirrors the reference current I accurately through the cascode transistor P3 into the output circuit 315. The source voltage of transistor P4' will also equal Vdd−IR+Vdsat1 so there are no body effects affecting the matching of transistors P4 and P4'. Similarly, the source voltage of transistor P5 is only a Vdsat1 in voltage difference from the source voltage of transistor P1. Thus, there is relatively little body effect to cause the threshold voltage Vth1 generation by transistor P5 to be erroneous. In addition, there is more voltage margin for cascode bias circuit 605 as compared to a PMOS implementation of cascode bias circuit 300. A PMOS cascode bias circuit implementation will now be discussed in which the PMOS cascode current mirror does not include the equivalents of diode-connected transistor P1 and its corresponding cascode transistor P4.

Figure 6B:
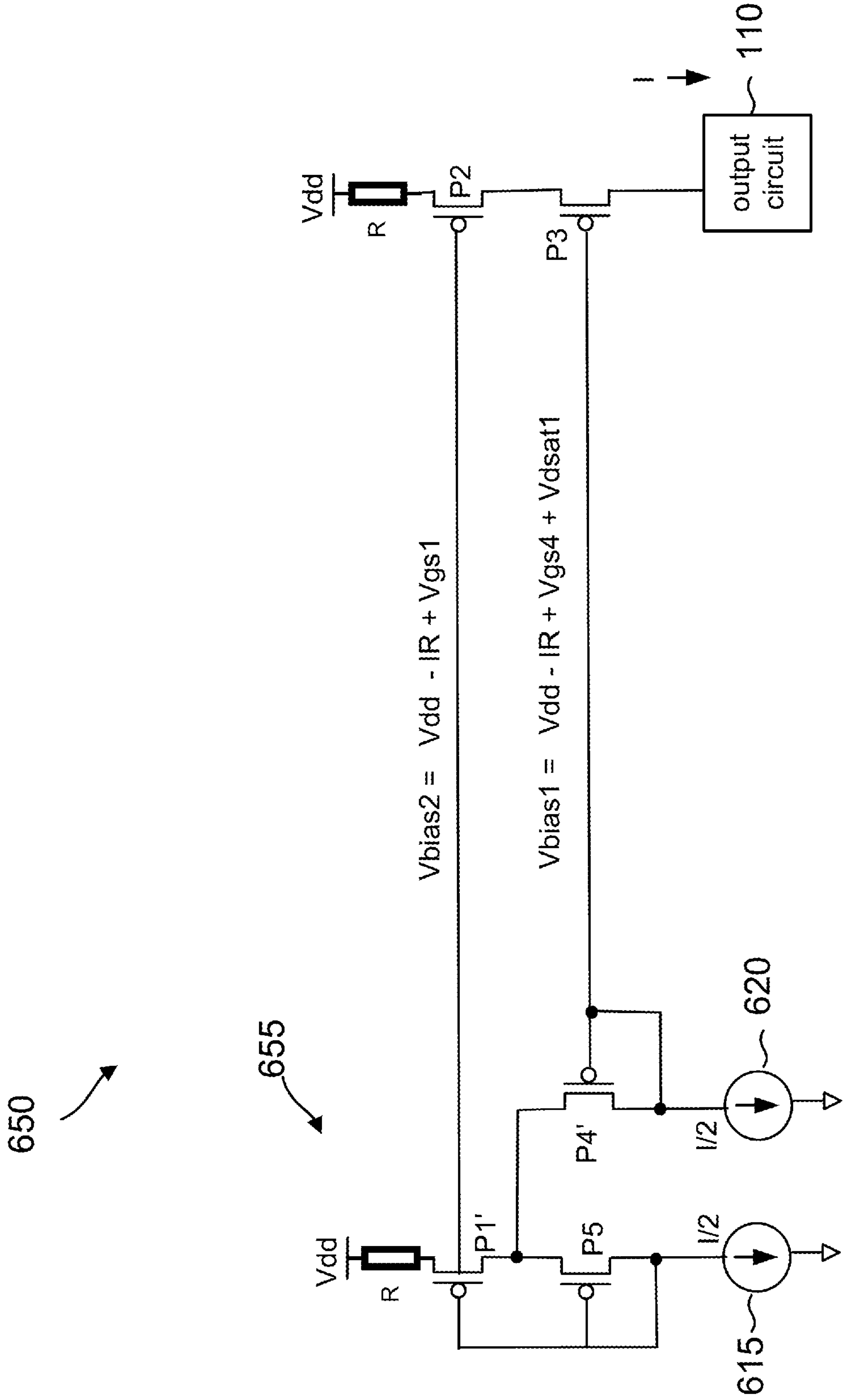
FIG. 6B is a circuit diagram of a PMOS cascode current mirror including a cascode bias circuit in which the cascode bias circuit biases only the gates of a cascode transistor and of a current source transistor in accordance with an aspect of the disclosure.

An example cascode bias circuit 655 is shown in FIG. 6B for the biasing of a current source transistor P2 and a cascode transistor P3 in a PMOS cascode current mirror 650. Transistors P1', P4', P5, and current sources 615 and 620 are arranged as discussed for cascode bias circuit 605. A gate voltage of transistor P4' thus functions as a cascode bias voltage to bias a gate of cascode transistor P3. Transistor P4' and cascode transistor P3 are matched. Similarly, transistors P1' and current source transistor P2 are matched. The gate voltage of transistor P1' equals Vdd−IR+Vgs1 as discussed for cascode bias circuit 605. But the gate of transistor P1' in cascode bias circuit 655 now couples to a gate of the current source transistor P2. The gate voltage of transistor P4' is thus denoted as a first cascode bias voltage Vbias1 whereas the gate voltage of transistor P1' is denoted as a second cascode bias voltage Vbias2. Since both the gates of transistors P1 and P1' are coupled and their source voltages are equal, a gate-to-source voltage Vgs1 of transistor P1' equals the gate-to-source voltage of transistor P2. Transistor P5 is sized so that its gate-to-source voltage substantially equals the threshold voltage Vth1 of the transistor P1'. The drain voltage of transistor P1' and the current source transistor P2 thus both equal Vdd−IR+Vgs1−Vth1. With transistor P1' being effectively diode connected, transistors P1' and P2 having the same gate-to-source voltage, and with transistors P1' and P2 having the same drain-to-source voltage, current source transistor P2 will accurately mirror the reference current I. In addition, cascode bias circuit 655 has the advantages over the approach of cascode bias circuit 300 as discussed analogously with regard to cascode bias circuit 605.

Figure 7:
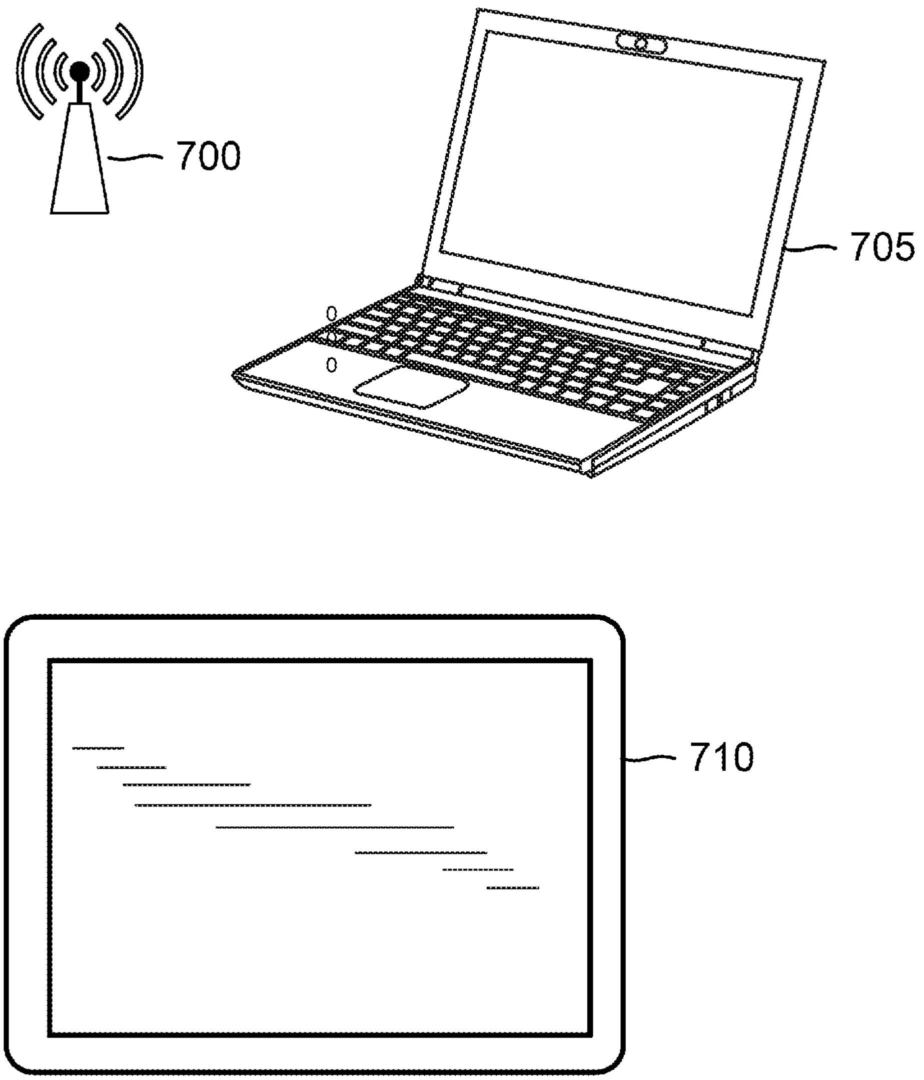
FIG. 7 illustrates some example electronic devices including a cascode bias circuit in accordance with an aspect of the disclosure.

A cascode bias circuit as disclosed herein may be incorporated in any suitable mobile device or electronic system. For example, as shown in FIG. 7, a base station 700, a laptop computer 705, and a tablet PC 710 may all include a cascode bias circuit in accordance with the disclosure. Other exemplary electronic systems such as a cellular telephone, a music player, a video player, a communication device, and a personal computer may also be configured with a cascode bias circuit constructed in accordance with the disclosure.

Figure 8:
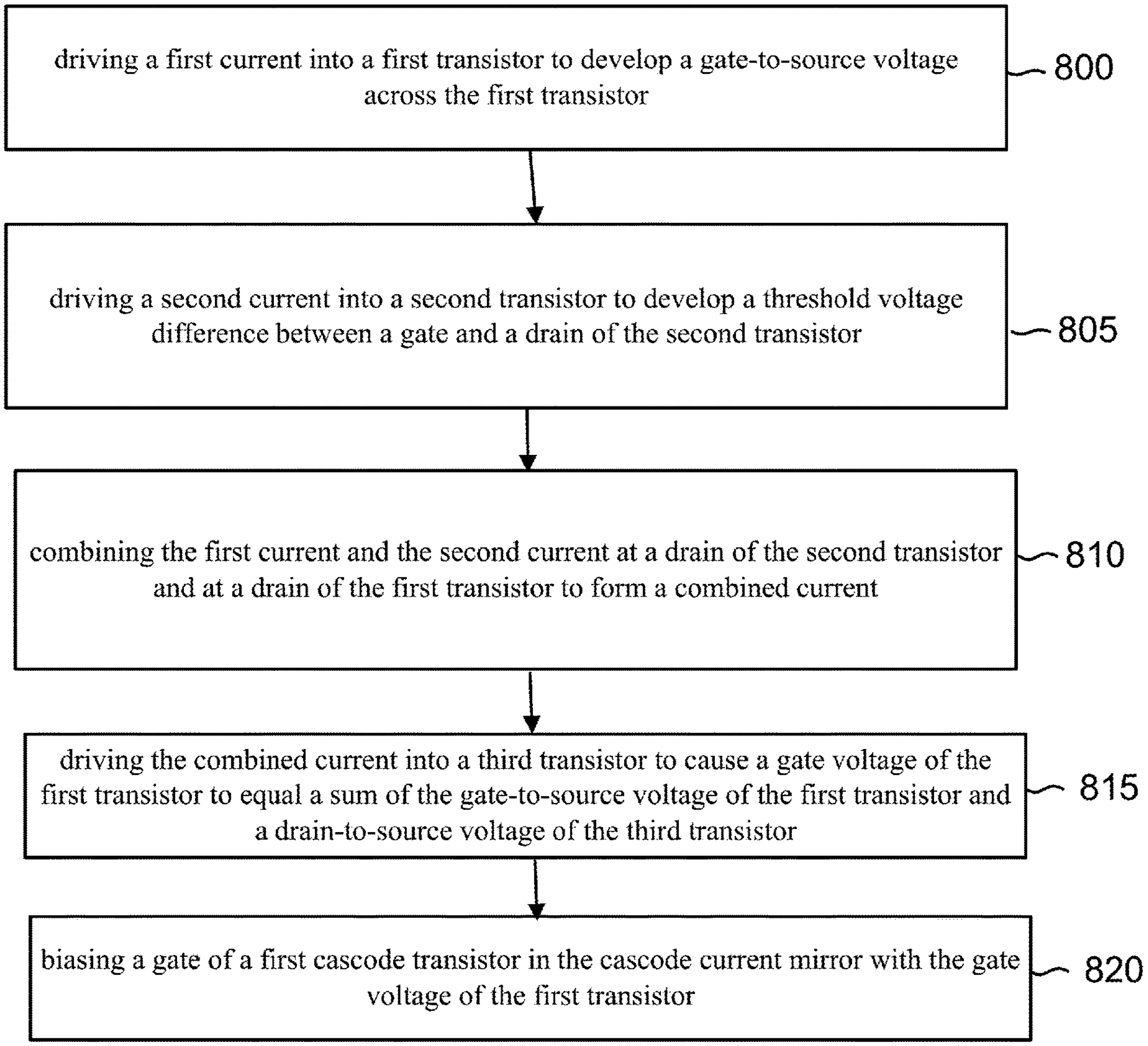
FIG. 8 is a flowchart for an example method of cascode current mirror biasing in accordance with an aspect of the disclosure.

A method of biasing a cascode current mirror will now be discussed with reference to the flowchart of FIG. 8. The method includes an act 800 of driving a first current into a first transistor to develop a gate-to-source voltage across the first transistor. The driving of transistor M10 by current source 410 and the driving of transistor P4' by current source 620 are examples of act 800. The method further includes an act 805 of driving a second current into a second transistor to develop a threshold voltage difference between a gate and a drain of the second transistor. The driving of transistor M9 by current source 405 or the driving of transistor P5 is an example of act 805. The method also includes an act 810 of combining the first current and the second current at a drain of the second transistor and at a drain of the first transistor to form a combined current. The combination of the currents from current sources 405 and 410 or from current sources 615 and 620 is an example of act 810. In addition, the method includes an act 815 of driving the combined current into a third transistor to cause a gate voltage of the first transistor to equal a sum of the gate-to-source voltage of the first transistor and a drain-to-source voltage of the third transistor. The driving of the combined current through transistor P1' or through transistor M8 is an example of act 815. Finally, the method includes an act 820 of biasing a gate of a first cascode transistor in the cascode current mirror with the gate voltage of the first transistor. The biasing of any of the cascode transistor M3, M4, P3, or P4 is an example of act 820.

The disclosure will now be summarized in the following series of clauses:

Clause 1. A cascode bias circuit, comprising:
- a first current source configured to source a first current;
- a second current source configured to source a second current;
- a first transistor having a drain coupled to the first current source;
- a second transistor having a source coupled to a source of the first transistor and having a drain coupled to the second current source; and
- a third transistor having a drain coupled to a source of the first transistor and coupled to a source of the second transistor.

Clause 2. The cascode bias circuit of clause 1, wherein the first transistor and the second transistor are each diode connected.

Clause 3. The cascode bias circuit of any of clauses 1-2, wherein a gate of the first transistor is coupled to a gate of a first cascode transistor in a cascode current mirror.

Clause 4. The cascode bias circuit of clause 3, wherein the first current equals the second current, and wherein the cascode current mirror further includes a first diode-connected transistor arranged in series with the first cascode transistor and in series with a third current source that is configured to source a third current that is twice as large as the first current.

Clause 5. The cascode bias circuit of any of clauses 3-4, wherein a gate of the second transistor is coupled to a gate of the third transistor.

Clause 6. The cascode bias circuit of any of clauses 3-5, wherein the second transistor is configured to have a gate-to-source voltage equaling a transistor threshold voltage.

Clause 7. The cascode bias circuit of clause 4, wherein the cascode current mirror further includes:
- a current source transistor having a gate coupled to the gate of the first diode-connected transistor; and
- a second cascode transistor arranged in series with the current source transistor and having a gate coupled to the gate of the first transistor.

Clause 8. The cascode bias circuit of any of clauses 1-9, wherein the first transistor, the second transistor, and the third transistor each comprises an n-type metal-oxide semiconductor transistor.

Clause 9. The cascode bias circuit of any of clauses 1-9, wherein the first transistor, the second transistor, and the third transistor each comprises a p-type metal-oxide semiconductor transistor.

Clause 10. The cascode bias circuit of clause 7, further comprising:
- a first resistor coupled to a source of the third transistor.

Clause 11. The cascode bias circuit of clause 10, wherein the cascode current mirror further includes a second resistor coupled to a source of the first diode-connected transistor and includes a third resistor coupled to a source of the current source transistor.

Clause 12. The cascode bias circuit of clause 7, wherein the first current source, a size of the first transistor, the third current source, and a size of the first cascode transistor are all configured so that a current density of the first transistor matches a current density of the first cascode transistor.

Clause 13. The cascode bias circuit of clause 4, wherein a drain-to-source voltage of the second transistor matches a drain-to-source voltage of the first diode-connected transistor of the cascode current mirror.

Clause 14. The cascode bias circuit of any of clauses 1-14, wherein the cascode bias circuit is included within a cellular telephone.

Clause 15. The cascode bias circuit of clause 7, further comprising an output circuit coupled to a drain of the second cascode transistor of the cascode current mirror.

Clause 16. A method of biasing a cascode current mirror, comprising:
- driving a first current into a first transistor to develop a gate-to-source voltage across the first transistor;
- driving a second current into a second transistor to develop a threshold voltage difference between a gate and a drain of the second transistor;

combining the first current and the second current at a drain of the second transistor and at a drain of the first transistor to form a combined current;

driving the combined current into a third transistor to cause a gate voltage of the first transistor to equal a sum of the gate-to-source voltage of the first transistor and a drain-to-source voltage of the third transistor; and biasing a gate of a first cascode transistor in the cascode current mirror with the gate voltage of the first transistor.

Clause 17. The method of clause 16, further comprising:

biasing a gate of a current source transistor in the cascode current mirror with a gate voltage of the third transistor to cause the third transistor to conduct a mirrored version of the combined current.

Clause 18. The method of clause 16, further comprising:

biasing a gate of a second cascode transistor in the cascode current mirror with the gate voltage of the first transistor.

Clause 19. A cascode current mirror, comprising:

a first cascode transistor;

a current source transistor in series with the first cascode transistor;

a cascode bias circuit including:

a first transistor configured to conduct a first current to generate a first gate-to-source voltage, the first transistor having a gate coupled to a gate of the first cascode transistor;

a second transistor configured to conduct a second current to generate a second gate-to-source voltage substantially equal to a transistor threshold voltage; and a third transistor coupled to a drain of the first transistor and to drain of the second transistor, the third transistor having a gate coupled to a gate of the second transistor.

Clause 20. The cascode current mirror of clause 19, further comprising:

a second cascode transistor having a gate coupled to the gate of the first transistor.

Clause 21. The cascode current mirror of any of clauses 19-20, wherein the cascode bias circuit further includes:

a first current source configured to source the first current; and a second current source configured to source the second current.

Clause 22. The cascode current mirror of any of clauses 19-21, wherein the first transistor and the second transistor are each diode-connected.

Clause 23. The cascode current mirror of clause 21, further comprising:

a fourth transistor in series with the first cascode transistor and having a gate coupled to a drain of the first cascode transistor; and a third current source configured to drive a third current into the drain of the first cascode transistor.

Clause 24. A cascode current mirror, comprising:

a first current source configured to source a first current;

a first cascode transistor configured to conduct the first current;

a cascode bias circuit including:

a second current source configured to source a second current;

a first transistor configured to conduct the second current and having a gate coupled to a gate of the first cascode transistor;

a second current source configured to source a third current;

a second transistor configured to conduct the second current; and a third transistor coupled to a drain of the first transistor and to drain of the second transistor, the third transistor having a gate coupled to a gate of the second transistor, wherein both the second current and the third current are less than the first current.

Clause 25. The cascode current mirror of clause 24, wherein the second current and the third current are each one-half of the first current.

Clause 26. The cascode current mirror of clause 24, wherein the second current and the third current are each one-fourth of the first current.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A cascode bias circuit, comprising:

a first current source configured to provide a first current;

a second current source configured to provide a second current;

a first transistor having a drain coupled to the first current source, and a gate coupled to a gate of a first cascode transistor in a cascode current mirror;

a second transistor having a source coupled to a source of the first transistor and having a drain coupled to the second current source; and a third transistor having a drain coupled to the source of the first transistor and coupled to a source of the second transistor, wherein the first current equals the second current, and wherein the cascode current mirror further includes a first diode-connected transistor arranged in series with the first cascode transistor and in series with a third current source that is configured to provide a third current that is twice as large as the first current, and wherein a drain-to-source voltage of the second transistor matches a drain-to-source voltage of the first diode-connected transistor of the cascode current mirror.

2. The cascode bias circuit of claim 1, wherein the first transistor and the second transistor are each diode connected.

3. The cascode bias circuit of claim 1, wherein a gate of the second transistor is coupled to a gate of the third transistor.

4. The cascode bias circuit of claim 1, wherein the second transistor is configured to have a gate-to-source voltage equaling a transistor threshold voltage.

5. The cascode bias circuit of claim 1, wherein the cascode current mirror further includes:

a current source transistor having a gate coupled to the gate of the first diode-connected transistor; and a second cascode transistor arranged in series with the current source transistor and having a gate coupled to the gate of the first transistor.

6. The cascode bias circuit of claim 5, further comprising:

a first resistor coupled to a source of the third transistor.

7. The cascode bias circuit of claim 6, wherein the cascode current mirror further includes a second resistor coupled to a source of the first diode-connected transistor and includes a third resistor coupled to a source of the current source transistor.

8. The cascode bias circuit of claim 5, wherein the first current source, a size of the first transistor, the third current source, and a size of the first cascode transistor are all configured so that a current density of the first transistor matches a current density of the first cascode transistor.

9. The cascode bias circuit of claim 5, further comprising an output circuit coupled to a drain of the second cascode transistor of the cascode current mirror.

10. The cascode bias circuit of claim 1, wherein the first transistor, the second transistor, and the third transistor each comprises an n-type metal-oxide semiconductor transistor.

11. The cascode bias circuit of claim 1, wherein the first transistor, the second transistor, and the third transistor each comprises a p-type metal-oxide semiconductor transistor.

12. The cascode bias circuit of claim 1, wherein the cascode bias circuit is included within a base station.

13. A method of biasing a cascode current mirror, comprising:

driving a first current into a first transistor to develop a gate-to-source voltage across the first transistor;

driving a second current into a second transistor to develop a threshold voltage difference between a gate and a drain of the second transistor;

combining the first current and the second current at a drain of the second transistor and at a drain of the first transistor to form a combined current;

driving the combined current into a third transistor to cause a gate voltage of the first transistor to equal a sum of the gate-to-source voltage of the first transistor and a drain-to-source voltage of the third transistor;

biasing a gate of a first cascode transistor in the cascode current mirror with the gate voltage of the first transistor, and biasing a gate of a current source transistor in the cascode current mirror with a gate voltage of the third transistor to cause the third transistor to conduct a mirrored version of the combined current.

14. The method of claim 13, further comprising:

biasing a gate of a second cascode transistor in the cascode current mirror with the gate voltage of the first transistor.

* * * * *